United States Patent
M et al.

(10) Patent No.: US 12,468,954 B1
(45) Date of Patent: Nov. 11, 2025

(54) APPARATUS AND METHOD FOR OPTIMIZING AN OPERATION USING A DEVIATION

(71) Applicant: nference, Inc., Cambridge, MA (US)

(72) Inventors: Praveen Kumar M, Bengaluru (IN); Purushottam Sinha, Bihar (IN); Rakesh Barve, Bengaluru (IN)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/907,213

(22) Filed: Oct. 4, 2024

(51) Int. Cl.
*G06N 3/09* (2023.01)
*G06N 3/0475* (2023.01)

(52) U.S. Cl.
CPC ............. *G06N 3/09* (2023.01); *G06N 3/0475* (2023.01)

(58) Field of Classification Search
CPC ................................ G06N 3/09; G06N 3/0475
See application file for complete search history.

(56) References Cited

U.S. PATENT DOCUMENTS

| | | |
|---|---|---|
| 11,969,216 B2 | 4/2024 | Shelton, IV et al. |
| 2024/0037949 A1 | 2/2024 | Johnston et al. |
| 2024/0153269 A1 | 5/2024 | Addis et al. |
| 2024/0161934 A1 | 5/2024 | Johnston et al. |
| 2024/0221895 A1 | 7/2024 | Shelton, IV et al. |

OTHER PUBLICATIONS

Liu, Y., Zhao, Y., Lin, Q., Pan, W., Wang, W., & Ge, E. (2023). DeviationGAN: A generative end-to-end approach for the deviation prediction of sheet metal assembly. Mechanical Systems and Signal Processing, 204, 110822. (Year: 2023).*
Mo, B., Wang, Q., Guo, X., Winkenbach, M., & Zhao, J. (2023). Predicting drivers' route trajectories in last-mile delivery using a pair-wise attention-based pointer neural network. Transportation Research Part E: Logistics and Transportation Review, 175, 103168. (Year: 2023).*
Marcus, R., Negi, P., Mao, H., Tatbul, N., Alizadeh, M., & Kraska, T. (2021, June). Bao: Making learned query optimization practical. In Proceedings of the 2021 International Conference on Management of Data (pp. 1275-1288). (Year: 2021).*

(Continued)

*Primary Examiner* — Kamran Afshar
*Assistant Examiner* — Lokesha Patel
(74) *Attorney, Agent, or Firm* — Caldwell Intellectual Property Law

(57) ABSTRACT

An apparatus and method for optimizing an operation using a deviation are disclosed. The apparatus includes a memory communicatively connected to at least a processor, wherein the memory contains instructions configuring the at least a processor to receive a plurality of operation notes associated with a plurality of operators and a plurality of operations, label the plurality of operation notes to at least an operation label, identify at least an operation deviation, using a language processing module, in a portion of the plurality of operation notes having the at least a matching operation label as a function of at least an operation factor, determine a relevance datum of the at least an operation deviation, determine an effectiveness datum of the at least an operation deviation and generate modified operation data as a function of the effectiveness datum and the relevance datum of the at least an operation deviation.

20 Claims, 10 Drawing Sheets

(56) References Cited

OTHER PUBLICATIONS

Goodman, E. D., Patel, K. K., Zhang, Y., Locke, W., Kennedy, C. J., Mehrotra, R., . . . & Yeung, S. (2021). A real-time spatiotemporal AI model analyzes skill in open surgical videos. arXiv preprint arXiv:2112.07219. (Year: 2021).*

Yu, J., Lin, X., Yu, Z., & Xing, X. (2023). Gptfuzzer: Red teaming large language models with auto-generated jailbreak prompts. arXiv preprint arXiv:2309.10253. (Year: 2023).*

* cited by examiner

Patient Information: — 704
Name: John Doe
Age: 58
Gender: Male
Medical Record Number: 123456789

Date and Time of Surgery:
September 12, 2024, 8:30 AM

Surgeon:
Dr. Jane Smith — 712

Preoperative Diagnosis: — 708
Cholelithiasis (Gallstones)

Assistants:
Dr. Michael Lee, Nurse Sarah Thompson

Procedure Performed: — 124
Laparoscopic Cholecystectomy

Anesthesia:
General anesthesia administered by Dr. Emily Brown

Tools Used in Procedure: — 740
Tool X, Tool Y, Tool Z

Intraoperative Findings:
The gallbladder was found to be inflamed but not perforated. Multiple stones were present, with no evidence of bile duct obstruction.

Details of Procedure: — 716

The patient was placed in the supine position, and general anesthesia was induced.
A Veress needle was used to establish pneumoperitoneum.
Four trocars were placed under direct visualization.
The gallbladder was identified and carefully dissected from the liver bed using electrocautery.
The cystic duct and artery were clipped and divided.
The gallbladder was removed through the umbilical port in an EndoCatch bag.
Hemostasis was ensured, and the abdominal cavity was irrigated with saline.
The pneumoperitoneum was released, and the trocars were removed.
The incisions were closed with absorbable sutures and covered with sterile dressings.

Estimated Blood Loss: — 720
Less than 50 mL.

Specimens Removed:
Gallbladder with multiple stones, sent for pathological examination.

Complications: — 724
None

Postoperative Condition: — 728
The patient was extubated and transferred to the recovery room in stable condition. Vital signs were stable, with no immediate postoperative complications.

Plan — 732
The patient will be monitored in the recovery room for 1-2 hours before being transferred to the surgical ward. Postoperative pain will be managed with IV analgesics. The patient is expected to begin oral intake as tolerated later in the day and may be discharged home the following day if recovery proceeds without complications.

Outcome: — 736
The patient stayed in the recovery room for 3 hours and sent to the surgical ward. The patient was discharged after 5 days in the bed. The patient was fully recovered.

Patient Information:
Name: John Doe
Age: 58
Gender: Male
Medical Record Number: 123456789

Preoperative Diagnosis:
Cholelithiasis (Gallstones)

Procedure Performed:
Laparoscopic Cholecystectomy

Intraoperative Findings:
The gallbladder was found to be inflamed but not perforated. Multiple stones were present, with no evidence of bile duct obstruction.

Details of Procedure:
The patient was placed in the supine position, and general anesthesia was induced. A Veress needle was used to establish pneumoperitoneum. Four trocars were placed under direct visualization. The gallbladder was identified and carefully dissected from the liver bed using electrocautery. The cystic duct and artery were clipped and divided. The gallbladder was removed through the umbilical port in an EndoCatch bag. Hemostasis was ensured, and the abdominal cavity was irrigated with saline. The pneumoperitoneum was released, and the trocars were removed. The incisions were closed with absorbable sutures and covered with sterile dressings. It is estimated that the patient lost less than 50mL of blood. A Galbladder was removed. The Galbladder had multiple stones and was sent for pathological examination. There were no complication with the procedure. The patient was extubated and transferred to the recovery room in stable condition. Vital signs were stable, with no immediate postoperative complications. The patient stayed in the recovery room for 3 hours and sent to the surgical ward. The patient was discharged after 5 days in the bed. The patient was fully recovered.

APPARATUS AND METHOD FOR OPTIMIZING AN OPERATION USING A DEVIATION

FIELD OF THE INVENTION

The present invention generally relates to the field of language processing and analysis. In particular, the present invention is directed to an apparatus and method for optimizing an operation using a deviation.

BACKGROUND

In the field of surgical research, while extensive studies have been conducted on the outcome effectiveness of different surgical techniques, the variations that exist within a specific surgical technique often remain underexplored. These subtle variations, which can significantly impact patient outcomes, are typically documented in the unstructured physician notes that accompany operative procedures and clinical records. However, the unstructured nature of these notes makes it challenging to systematically analyze and assess the effectiveness of these variations.

SUMMARY OF THE DISCLOSURE

In an aspect, an apparatus for optimizing an operation using a deviation is disclosed. The apparatus includes at least a processor and a memory communicatively connected to the at least a processor, wherein the memory contains instructions configuring the at least a processor to receive a plurality of operation notes associated with a plurality of operators and a plurality of operations, label the plurality of operation notes to at least an operation label using a label classifier, identify at least an operation deviation, using a language processing module, in a portion of the plurality of operation notes having the at least a matching operation label as a function of at least an operation factor, determine a relevance datum of the at least an operation deviation, determine an effectiveness datum of the at least an operation deviation, wherein determining the effectiveness datum includes identifying outcome data within the plurality of operation notes associated with the at least a matching operation label using the language processing module and determining the effectiveness datum as a function of the outcome data and generate modified operation data as a function of the effectiveness datum and the relevance datum of the at least an operation deviation.

In another aspect, a method for optimizing an operation using a deviation is disclosed. The method includes receiving, using at least a processor, a plurality of operation notes associated with a plurality of operators and a plurality of operations, labeling, using the at least a processor, the plurality of operation notes to at least an operation label using a label classifier, identifying, using the at least a processor, at least an operation deviation, using a language processing module, in a portion of the plurality of operation notes having the at least a matching operation label as a function of at least an operation factor, determining, using the at least a processor, a relevance datum of the at least an operation deviation, determining, using the at least a processor, an effectiveness datum of the at least an operation deviation, wherein determining the effectiveness datum includes identifying outcome data within the plurality of operation notes associated with the at least a matching operation label using the language processing module and determining the effectiveness datum as a function of the outcome data and generating, using the at least a processor, modified operation data as a function of the effectiveness datum and the relevance datum of the at least an operation deviation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7A illustrates an exemplary set of operation notes labeled with a plurality of operation labels;

FIG. 7B illustrates another exemplary set of operation notes labeled with a plurality of operation labels;

DETAILED DESCRIPTION

At a high level, aspects of the present disclosure are directed to apparatuses and methods for optimizing an operation using a deviation are disclosed. The apparatus includes at least a processor and a memory communicatively connected to the at least a processor, wherein the memory contains instructions configuring the at least a processor to receive a plurality of operation notes associated with a plurality of operators and a plurality of operations, label the plurality of operation notes to at least an operation label using a label classifier, identify at least an operation deviation, using a language processing module, in a portion of the plurality of operation notes having the at least a matching operation label as a function of at least an operation factor, determine a relevance datum of the at least an operation deviation, determine an effectiveness datum of the at least an operation deviation, wherein determining the effectiveness datum includes identifying outcome data within the plurality of operation notes associated with the at least a matching operation label using the language processing module and determining the effectiveness datum as a function of the outcome data and generate modified operation data as a function of the effectiveness datum and the relevance datum of the at least an operation deviation. Exemplary embodiments illustrating aspects of the present disclosure are described below in the context of several specific examples.

Figure 1:
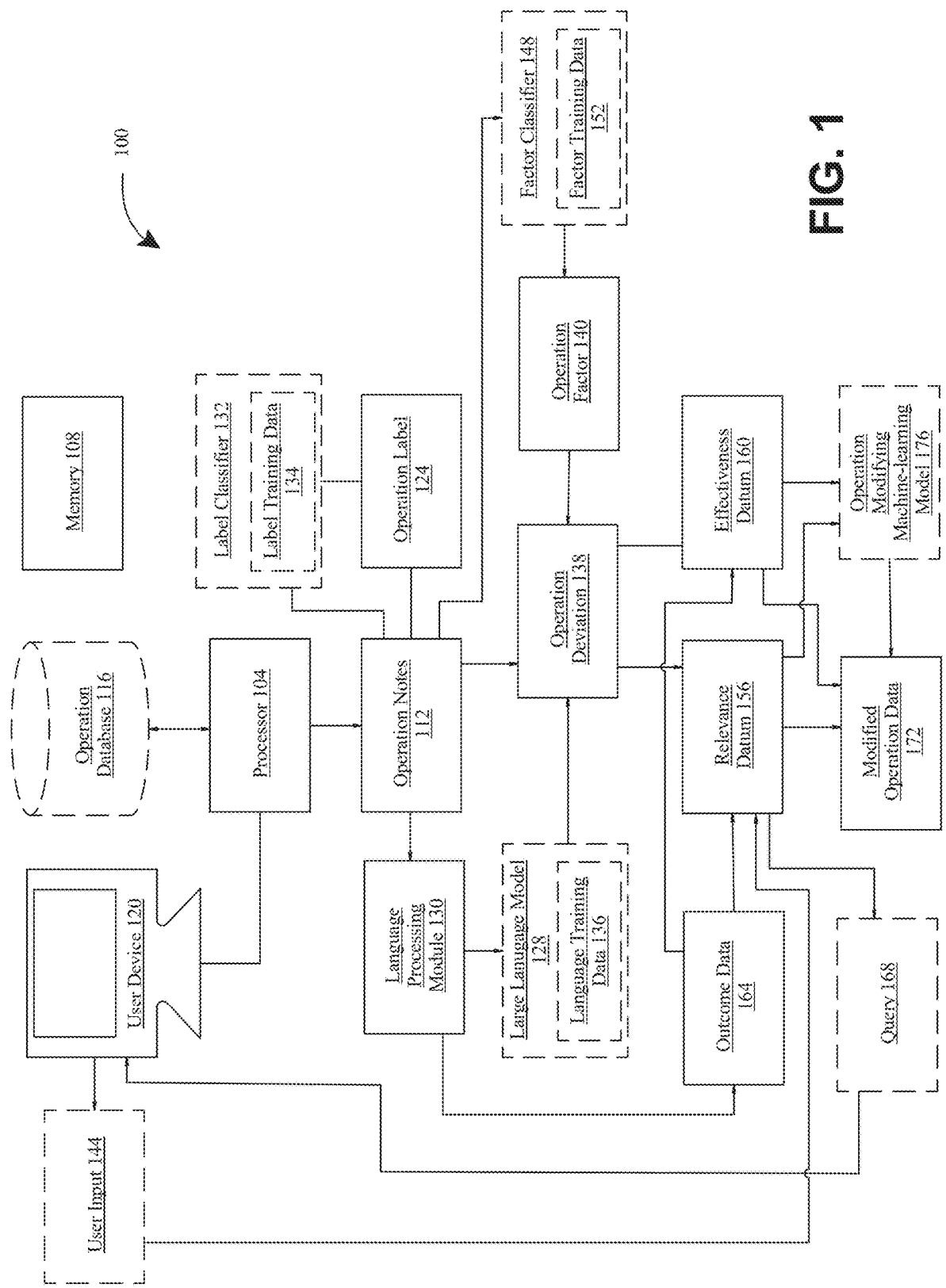
FIG. 1 illustrates a block diagram of an exemplary apparatus for optimizing an operation using a deviation.

Referring now to FIG. 1, an exemplary embodiment of an apparatus 100 for optimizing an operation using a deviation is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive a plurality of operation notes 112 associated with a plurality of operators and a plurality of operations. For the purposes of this disclosure, "operation notes" are records of operations. For the purposes of this disclosure, a "subject" is an individual who receives medical care, treatment, or consultation from an operator. As a non-limiting example, subject may include a patient. Operation note 112 may be a written record created by a surgeon after a surgical procedure. Operation note 112 may be hand-written or digital record. As a non-limiting example, operation note 112 may be a scanned copy of hand-written note. As a non-limiting example, operation note 112 may include patient information, date and time of surgery, preoperative diagnosis, postoperative diagnosis, procedure performed, surgeon and team members, anesthesia used, intraoperative findings, details of the procedure, incision and approach, complications, estimated blood loss, specimens removed, postoperative condition, plan, and the like. For the purposes of this disclosure, a "operator" is a person who performs an operation. As a non-limiting example, operator may include a surgeon, physician, clinician, nurses, doctors, medical professionals, hospitals, medical organization, and the like. For the purposes of this disclosure, an "operation" is a medical procedure performed on a patient to diagnose, treat, or repair a medical condition. Operation may involve manual and instrumental techniques by a surgeon to alter tissues, organs, or other parts of the body. As a non-limiting example, operations can range from minor procedures, such as the removal of a mole, to major surgeries, such as heart bypass surgery.

With continued reference to FIG. 1, in some embodiments, operation notes 112 may include electronic health record (EHR). For the purposes of this disclosure, an "electronic health record" is the systematized collection of patient and population electronically stored health information in a digital format. For example, and without limitation, operation notes 112 may include range of information, including patient demographics, patient identifier, medical history, medication and allergies, immunization status, laboratory test results, radiology images, vital signs, personal statistics like age and weight, billing information, and the like.

With continued reference to FIG. 1, processor 104 may receive operation notes 112 using an application programming interface (API). As used in the current disclosure, an "application programming interface" is a software interface for two or more computer programs to communicate with each other. As a non-limiting example, API may include EHR APIs, telemedicine APIs, health organization APIs, and the like. An application programming interface may be a type of software interface, offering a service to other pieces of software. In contrast to a user interface, which connects a computer to a person, an application programming interface may connect computers or pieces of software to each other. An API may not be intended to be used directly by a person (e.g., the end user) other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet. API may be configured to query for web applications in order to retrieve operation notes 112 to another web application, database (e.g., operation database 116), medical center patient portal, and the like. An API may be further configured to filter through web applications according to a filter criterion. In this disclosure, "filter criteria" are conditions the web applications must fulfill in order to qualify for API. Web applications may be filtered based on these filter criteria. Filter criteria may include, without limitation, types of medical facilities, location of the medical facility, and the like.

With continued reference to FIG. 1, in some embodiments, processor 104 may receive operation notes 112 from user device 120. For the purposes of this disclosure, a "user device" is any device a user can use to input data into apparatus 100. For the purposes of this disclosure, a "user" is any person, individual, organization or entity that is using or has used apparatus 100. As a non-limiting example, user may include operator. As a non-limiting example, user device 120 may include a laptop, desktop, tablet, mobile phone, smart phone, smart watch, kiosk, smart headset, or things of the like. In some embodiments, user device 120 may include an interface configured to receive inputs from user. In some embodiments, user may manually input any data into apparatus 100 using user device 120. In some embodiments, user may have a capability to process, store or transmit any information independently.

With continued reference to FIG. 1, in some embodiments, apparatus 100 may include an operation database 116. As used in this disclosure, an "operation database" is a data store configured to store data associated with note data. As a non-limiting example, operation database 116 may store operation notes 112, information related to patients or operators, and the like. In one or more embodiments, operation database 116 may include inputted or calculated information and datum related to operation notes 112. In some embodiments, a datum history may be stored in operation database 116. As a non-limiting example, the datum history may include real-time and/or previous inputted data related to operation notes 112. As a non-limiting example, operation database 116 may include instructions from a user, who may be an expert user, a past user in embodiments disclosed herein, or the like, where the instructions may include examples of the data related to operation notes 112.

With continued reference to FIG. 1, in some embodiments, processor 104 may be communicatively connected with operation database 116. For example, and without limitation, in some cases, operation database 116 may be local to processor 104. In another example, and without limitation, operation database 116 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store operation database 116. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, operation database 116 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described in this disclosure. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, memory 108 contains instructions configuring processor 104 to label a plurality of operation notes 112 to at least an operation label 124. For the purposes of this disclosure, an "operation label" is a descriptive categorization of an operation note based on attributes or criteria. In some embodiments, operation label 124 may categorize operation notes 112. In some embodiments, operation label 124 may represent specific types of medical conditions that is subject to get procedures or surgeries. As a non-limiting example, operation label 124 may include pancreatic carcinoma, aortic aneurysm, and the like. In some embodiments, operation label 124 may represent types of procedures or surgeries performed for the specific medical conditions. As a non-limiting example, operation label 124 may include pancreaticoduodenectomy (Whipple's procedure), distal pancreatectomy, and total pancreatectomy. For example, and without limitation, operation label 124 for a first operation note 112 may be 'pancreatic carcinoma: pancreaticoduodenectomy' and operation label 124 for a second operation note 112 may be 'pancreatic carcinoma: distal pancreatectomy.' In some embodiments, operation label 124 may be stored in operation database 116. In some embodiments, operation label 124 may be retrieved from operation database 116. In some embodiments, operation label 124 may be manually input by a user.

Figure 8:
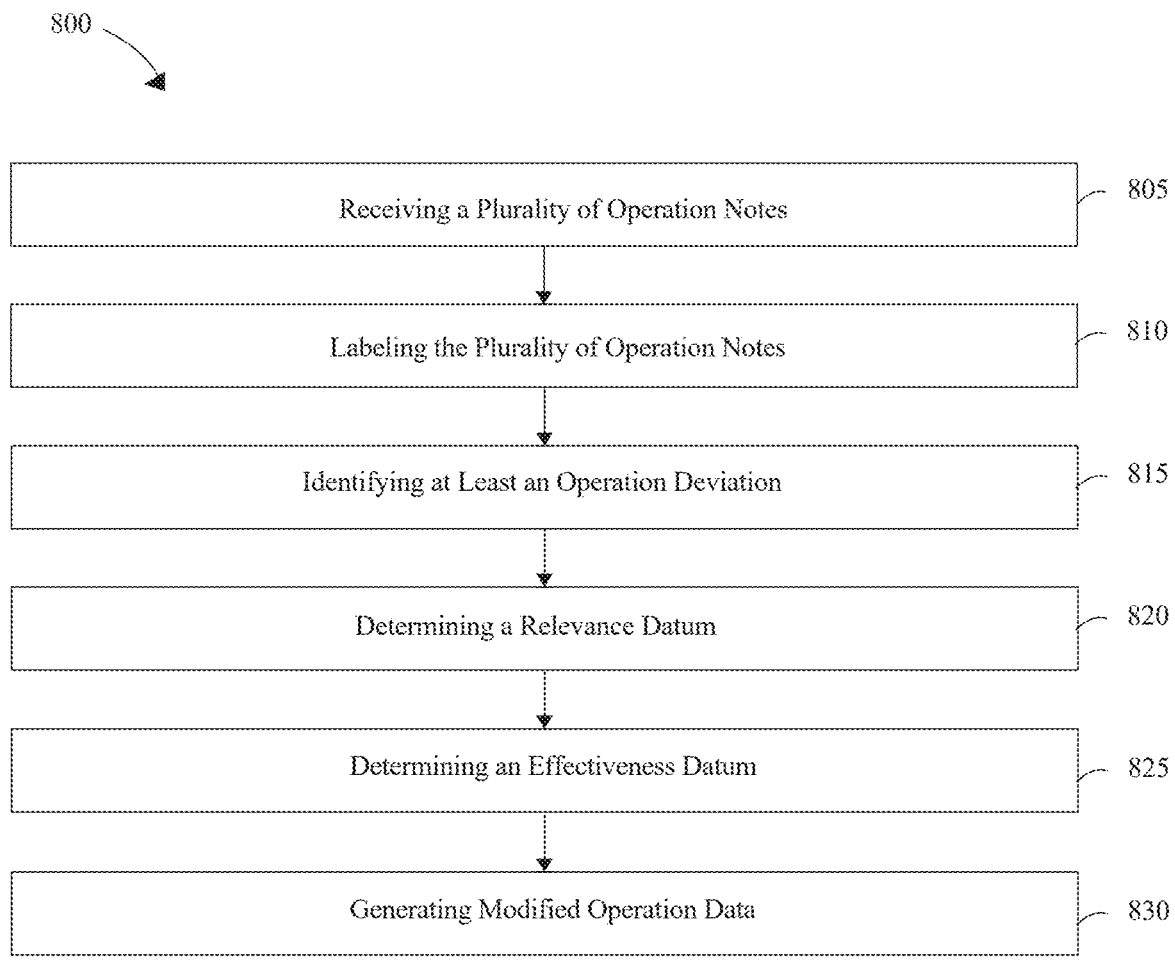
FIG. 8 illustrates a flow diagram of an exemplary method for optimizing an operation using a deviation.

With continued reference to FIG. 1, in some embodiments, operation label 124 may include an operator, outcome, procedure, tool, patient, plan, complication or error, estimated blood loss, postoperative condition label, and the like. This list is indicative but not exhaustive. The operation labels 124 are illustrated in FIG. 8. For the purposes of this disclosure, an "operator label" is a descriptive categorization of a segment of an operation note, based on the specific surgeons or practitioners (operators) involved. For the purposes of this disclosure, an "outcome label" is a descriptive categorization of a segment of an operation note, based on the outcome of the surgery or medical procedure. For the purposes of this disclosure, a "procedure label" is a descriptive categorization of a segment of an operation note, based on the specific details of the surgery or medical procedure. For the purposes of this disclosure, a "tool label" is a descriptive categorization of a segment of an operation note, based on the specific tools used in the surgery or medical procedure. For the purposes of this disclosure, a "patient label" is a descriptive categorization of a segment of an operation note, based on the patient information. For the purposes of this disclosure, a "plan label" is a descriptive categorization of a segment of an operation note, based on the postoperative plan. For the purposes of this disclosure, a "complication label" is a descriptive categorization of a segment of an operation note, based on the complication from the surgery or medical procedure. For the purposes of this disclosure, an "estimated blood loss label" is a descriptive categorization of a segment of an operation note, based on the estimated blood loss after the surgery or medical procedure. For the purposes of this disclosure, a "postoperative condition label" is a descriptive categorization of a segment of an operation note, based on the postoperative condition of the patient after the surgery or medical procedure.

With continued reference to FIG. 1, labeling operation notes 112 may include analyzing operation notes 112 using various techniques, such as large language model (LLM) 128, natural language processing (NLP), rule-based engine, optical character recognition (OCR), language processing module 130, automatic speech recognition (ASR), classifier, and the like. In a non-limiting example, when operation note 112 is in audio format, then processor 104 may use ASR to analyze the operation note 112 and incorporate language processing module 130, LLM 128 or NLP to label the operation note 112 to operation label 124.

With continued reference to FIG. 1, in some embodiments, processor 104 may label operation note 112 to operation label 124 using a label classifier 132 that incorporates OCR and/or language processing module 130. For the purposes of this disclosure, a "label classifier" is an algorithm or model used in machine learning and artificial intelligence to categorize or label operation notes into operation labels. The label classifier 132 may be consistent with any classifier disclosed in this disclosure. The label classifier 132 may receive an output of language processing module 130 (e.g., keywords) and classify the keywords to operation label 124. The label classifier 132 may be trained with label training data 134 that includes exemplary keywords or exemplary operation notes correlated to exemplary operation labels. In some embodiments, label training data 134 may be stored in operation database 116. In some embodiments, label training data 134 may be received from one or more users, operation database 116, external computing devices, and/or previous iterations of processing. As a non-limiting example, label training data 134 may include instructions from a user, who may be an expert user, a past user in embodiments disclosed herein, or the like, which may be stored in memory and/or stored in operation database 116, where the instructions may include labeling of training examples.

With continued reference to FIG. 1, in some embodiments, processor 104 may analyze operation notes 112 using an OCR and language processing module 130. For the purposes of this disclosure, "optical character recognition" is a technology that enables the recognition and conversion of printed or written text into machine-encoded text. In some cases, processor 104 may be configured to recognize texts or keywords from printed or scanned operation notes 112. In some cases, the at least a processor 104 may transcribe much or even substantially all operation notes 112.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from operation notes 112 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR)

may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of operation notes 112. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the operation notes 112 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 6. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes operation notes 112. Since the adaptive classifier may have learned something useful a little too late to recognize characters on the first pass, a second pass may be run over the operation notes 112. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, processor 104 may use a language processing module 130 to find a keyword such as an operation label 124. For the purposes of this disclosure, a "language processing module" is a component within a software system or application that is designed to analyze, interpret, and generate human language in a way that allows the system to understand and interact with text or speech. Language processing module 130 may include natural language processing (NLP). The language processing module 130 may be configured to extract, from operation notes 112, one or more words. In a non-limiting example, language processing module 130 may incorporate OCR such that language processing module 130 can receive an output of OCR as an input to find operation label 124. One or more words may include, without limitation, strings of one or more characters, including without limitation any sequence or sequences of letters, numbers, punctuation, diacritic marks, medical abbreviation, spaces, whitespace, and other symbols, including any symbols usable as textual data as described above. Textual data (e.g., obtained from OCR or operation notes 112 itself) may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module 130 may operate to produce a language processing model. Language processing model may include a program automatically generated by processor 104 and/or language processing module 130 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module 130 may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 130 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module 130 may use a corpus of documents to generate associations between language elements in a language processing module 130 may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 104 may automatically obtain the document using such an identifier, for instance by submitting a request to a database or compendium of documents such as JSTOR as provided by Ithaka Harbors, Inc. of New York.

With continued reference to FIG. 1, in some embodiments, processor 104 may analyze operation notes 112 and determine operation label 124 for the operation notes 112 using a LLM 128. A "large language model," as used herein, is a deep learning data structure that can recognize, summarize, translate, predict and/or generate text and other content based on knowledge gained from massive datasets. Large language models 128 may be trained on large sets of data. Training sets may be drawn from diverse sets of data such as, as non-limiting examples, electronic health records (EHRs) containing structured and unstructured clinical data, annotated surgical reports, and detailed operation notes from various medical specialties. In some embodiments, training sets may include a variety of subject matters, such as, as nonlimiting examples, different surgical specialties like cardiothoracic surgery, neurosurgery, orthopedic surgery, and general surgery. They may also encompass subject matters related to preoperative and postoperative care, including anesthesia management, wound care, and postoperative monitoring, surgical complications, recovery protocols, patient outcomes, and case studies on rare or complex procedures. In some embodiments, training sets of an LLM 128 may include information from one or more public or private databases. As a non-limiting example, training sets may include databases associated with an entity. In some embodiments, training sets may include portions of documents associated with operation note 112 correlated to examples of outputs. In an embodiment, an LLM 128 may include one or more architectures based on capability requirements of an LLM 128. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM 128 may be generally trained. As used in this disclosure, a "generally trained" LLM is an LLM that is trained on a general training set comprising a variety of subject matters, data sets, and fields. In some embodiments, an LLM 128 may be initially generally trained. Additionally, or alternatively, an LLM 128 may be specifically trained. As used in this disclosure, a "specifically trained" LLM is an LLM that is trained on a specific training set, wherein the specific training set includes data including specific correlations for the LLM to learn. As a non-limiting example, an LLM 128 may be generally trained on a general training set, then specifically trained on a specific training set. In an embodiment, specific training of an LLM 128 may be performed using a supervised machine learning process. In some embodiments, generally training an LLM 128 may be performed using an unsupervised machine learning process. As a non-limiting example, specific training set may include information from a database. As a non-limiting example, specific training set may include operation notes focusing on a particular type of surgery encompassing detailed descriptions of surgical techniques, patient outcomes, and complications associated with those specific procedures. In an embodiment, training one or more machine learning models may include setting the parameters of the one or more models (weights and biases) either randomly or using a pretrained model. Generally training one or more machine learning models on a large corpus of text data (operation notes 112) can provide a starting point for fine-tuning on a specific task. A model such as an LLM 128 may learn by adjusting its parameters during the training process to minimize a defined loss function, which measures the difference between predicted outputs and ground truth. Once a model has been generally trained, the model may then be specifically trained to fine-tune the pretrained model on operation note 112 to adapt it to the task. Fine-tuning may involve training a model with language training data 136, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM 128 may include fine-tuning the pretrained model using Low-Rank Adaptation (LoRA). As used in this disclosure, "Low-Rank Adaptation" is a training technique for large language models 128 that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments, an LLM 128 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM 128 may include a text prediction based algorithm configured to receive operation note 112 and apply a probability distribution to the words already typed in a sentence to work out the most likely word to come next in augmented articles. For example, if some words that have already been typed are "Nice to meet", then it may be highly likely that the word "you" will come next. An LLM 128 may output such predictions by ranking words by likelihood or a prompt parameter. For the example given above, an LLM 128 may score "you" as the most likely, "your" as the next most likely, "his" or "her" next, and the like. An LLM 128 may include an encoder component and a decoder component.

With continued reference to FIG. 1, an LLM 128 may include a transformer architecture. In some embodiments, encoder component of an LLM 128 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM 128 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decoder model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM 128 may predict the next word by searching for a set of positions in a source sentence where the most relevant information is concentrated. An LLM 128 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM 128, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM 128 may pick up particular parts at different positions in the input sequence and over time compute an initial composition of the output sequence. In multi-head attention, an LLM 128 may include a transformer model of an attention mechanism. Attention mechanisms, as described above, may provide context for any position in the input sequence. For example, if the input data is a natural language sentence, the transformer does not have to process one word at a time. In multi-head attention, computations by an LLM 128 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM 128 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM 128 may either attend to all source words or predict the target sentence, thereby attending to a smaller subset of words.

With continued reference to FIG. 1, multi-headed attention in encoder may apply a specific attention mechanism called self-attention. Self-attention allows models such as an LLM 128 or components thereof to associate each word in the input, to other words. As a non-limiting example, an LLM 128 may learn to associate the word "you", with "how" and "are". It's also possible that an LLM 128 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM 128 to learn to extract and focus on different combinations of attention from its attention heads.

With continued reference to FIG. 1, in some embodiments, processor 104 may analyze operation notes 112 and label the operation notes 112 to operation label 124 using a rule-based engine. As used in this disclosure, a "rule-based engine" is a system that executes one or more rules a runtime production environment. As a non-limiting example, rule-based engine may include an operation label rule. As used in this disclosure, an "operation label rule" is a pair including a set of conditions and a set of actions related to labeling an operation note, wherein each condition within the set of conditions is a representation of a fact, an antecedent, or otherwise a pattern, and each action within the set of actions is a representation of a consequent. In a non-limiting example, operation label rule may include a condition of 'operation note related to pancreatic carcinoma' pair with an action of 'label operation note to 'pancreatic carcinoma' label' In some embodiments, rule-based engine may execute one or more operation label rules if any conditions within one or more operation label rules are met. In some embodiments, operation label rule may be stored in operation database 116.

With continued reference to FIG. 1, memory 108 contains instructions configuring processor 104 to identify at least an operation deviation 138, using a language processing module 130, in a portion of the plurality of operation notes 112 having the at least a matching operation label 124 as a function of at least an operation factor 140. For the purposes of this disclosure, an "operation deviation" is a difference in the way a surgical procedure is performed compared to other instances of the procedure. The operation deviation 138 may be subtle variations in surgeries or medical procedures. As a non-limiting example, operation deviation 138 may include sequence, surrounding structure, instrument handling, tissue handling, approach, preoperative management deviations, and any deviations thereof. As another non-limiting example, operation deviation 138 may include resection margins, tissue handling, vascular involvement, the extent of lymph node dissection, the extent of tissue removal and other subtle intricacies such as the preservation of surrounding structures, blood supply management, nerve preservation and patient-specific anatomical considerations. This list is indicative but not exhaustive. In some embodiments, operation deviation 138 may be stored in operation database 116. In some embodiments, processor 104 may retrieve operation deviation 138 from operation database 116. In some embodiments, user may manually input operation deviation 138.

With continued reference to FIG. 1, for the purposes of this disclosure, an "instrument handling deviation" is a difference in how surgical instruments are managed and used during a procedure. This can include variations in the grip, precision, speed, and technique with which instruments are handled, as well as differences in the selection of instruments for specific tasks. In a non-limiting example, one surgeon may first resect the pancreas and then perform the lymph node dissection, while another may reverse this order. Identifying the optimal sequence through analysis could lead to improved patient outcomes.

With continued reference to FIG. 1, for the purposes of this disclosure, a "sequence deviation" is a difference in the order or steps in which a surgical procedure is performed. The sequence deviation may be consistent with sequence variation. This may include the sequence in which surgical tasks are carried out, such as the order of incisions, tissue dissection, suturing, and the use of specific instruments or techniques during the operation. In a non-limiting example, the choice between using a scalpel, electrocautery, or laser for tissue dissection can result in different outcomes in terms of precision, blood loss, and healing. Variations may also occur in how sutures are placed or how stapling devices are used.

With continued reference to FIG. 1, for the purposes of this disclosure, a "surrounding structure deviation" is a difference in how surrounding structures are managed during the procedure. Surrounding structure deviation may be consistent with surrounding structure variation. In a non-limiting example, some surgeons may choose to ligate certain arteries before proceeding with the pancreatic resection, while others might dissect around the nerves to preserve function. These choices can impact the complexity and risk of the surgery. Likewise, in a non-limiting example, some surgeons might use electrocautery, others might prefer ligation or topical hemostatic agents. These techniques can vary depending on the surgeon's experience and the specific clinical scenario.

With continued reference to FIG. 1, for the purposes of this disclosure, a "tissue handling deviation" is a different method employed in manipulating, preserving, or resecting tissue during surgery. Tissue handling deviation may be consistent with tissue handling variation. As a non-limiting example, tissue handling may include the preservation of tissue integrity and management of margins. In a non-limiting example, some surgeons may opt for a more aggressive resection to ensure clear margins, while others may prioritize preserving as much healthy tissue as possible. This could also include variations in how tissues are sutured or glued during reconstruction.

With continued reference to FIG. 1, for the purposes of this disclosure, an "approach deviation" is a difference within surgical approaches including specific techniques and decisions made by the surgeon during the procedure. Approach deviation may be consistent with approach variation. In a non-limiting example, in an open pancreaticoduodenectomy, this might include variations in the type of incision used, such as subcostal vs. midline, the specific dissection planes utilized, or how the surgeon approaches the vascular structures. For minimally invasive procedures, this could include variations in port placement, the use of different instruments or robotic arms, or the sequence of how the organs are mobilized. Additionally, this might include variations in suture technique (e.g., interrupted vs. continuous sutures), the choice of materials (e.g., synthetic vs. biological grafts), or the specific way the anastomosis is reinforced (e.g., use of omentum or other tissue flaps).

With continued reference to FIG. 1, for the purposes of this disclosure, a "perioperative management deviation" is a variation in how patients are managed before, during, and after surgery. Perioperative management deviation may be consistent with perioperative management variation. In a non-limiting example, perioperative management deviation could include variations in the specific patient positioning techniques used to optimize surgical access and minimize complications, as well as subtle differences in how anesthesia is tailored to individual patient needs, such as the timing of anesthesia induction and maintenance strategies. Additionally, the way postoperative pain management is initiated and adjusted could be considered, focusing on how these decisions are customized based on the patient's intraoperative experience.

With continued reference to FIG. 1, in some embodiments, processor 104 may identify at least an operation deviation 138 in a portion of a plurality of operation notes 112 having at least a matching operation label 124 using language processing module 130, LLM 128, user input 144, statistical analysis, expert review, and the like. The user input 144 disclosed herein is further described below. In a non-limiting example, processor 104 may analyze operation notes 112 having at least a matching operation label 124 using language processing module 130 to find keywords. Processor 104, then, feed the keywords to LLM 128 to identify operation deviation 138 based on the keywords. In some embodiments, processor 104 may be configured to generate language training data 136. In a non-limiting example, language training data 136 may include exemplary operation notes or keywords of operation notes. For example, and without limitation, language training data 136 may include a plurality of portions or sets of operation notes 112 having a matching operation label 124. In another non-limiting example, language training data 136 may include exemplary operation notes, exemplary operation factors and/or exemplary operation labels correlated to exemplary operation deviations. In some embodiments, language training data 136 may be stored in operation database 116. In some embodiments, language training data 136 may be received from one or more users, operation database 116, external computing devices, and/or previous iterations of processing. As a non-limiting example, language training data 136 may include instructions from a user, who may be an expert user, a past user in embodiments disclosed herein, or the like, which may be stored in memory and/or stored in operation database 116, where the instructions may include labeling of training examples. In some embodiments, language training data 136 may be updated iteratively on a feedback loop. As a non-limiting example, processor 104 may update language training data 136 iteratively through a feedback loop as a function of operation label 124, operation note 112, previous operation deviations 138, output of label classifier, or the like. In a non-limiting example, processor 104 may update language training data 136 as a function of an output of factor classifier 148. Processor 104 may update language training data 136 as a function of an output of factor classifier 148 by merging the output into exemplary operation notes of the language training data 136. For example, and without limitation, is a model (factor classifier 148) is used to categorize operation deviations 138 as either "patient-specific" or "surgeon-specific," new operation notes 112 that include unique cases or updated clinical practices would be added to language training data 136. In some embodiments, processor 104 may be configured to generate large language model 128. In a non-limiting example, generating large language model 128 may include training, retraining, or fine-tuning large language model 128 using language training data 136 or updated language training data 136. In some embodiments, processor 104 may be configured to identify at least an operation deviation 138 in a portion of a plurality of operation notes 112 having at least a matching operation label 124 using large language model 128 (i.e. trained or updated large language model 128).

With continued reference to FIG. 1, in some embodiments, there may be operation factors 140 that contribute to operation deviation 138 seen among surgeons conducting the same procedure or surgeries: surgeon-specific factors and patient-specific factors. For the purposes of this disclosure, an "operation factor" is an element that influences the way a surgical procedure is performed, leading to operation deviations in how the procedure is carried out by different surgeons. Surgeon-specific factors may include the surgeon's experience, place of training, personal preference, exposure to new innovations in techniques, surgical philosophy, judgment in real time during the surgery, surgical team dynamics, time availability, scheduling, and the institutional protocols and resources at the location where the surgeon is practicing. On the other hand, patient-specific factors may encompass the unique anatomy of the patient, comorbidities, the location and extent of the tumor, the patient's age, and overall health.

With continued reference to FIG. 1, in some embodiments, processor 104 may identify operation factor 140 of operation note 112 using language processing module 130, LLM 128 or NLP. Processor 104 may categorize operation deviation 138 to whether they are due to patient-specific factor or surgeon-specific factor of operation factor 140. A natural language processing (NLP) model may be configured to process unstructured text data present in operation notes 112. The NLP module may identify and categorize operation deviations 138 within surgical procedures into two primary categories: "patient-specific factors" and "surgeon-specific factors" (operation factors 140). The NLP module may employ sophisticated language models, such as large language models (LLMs) 128, that have been trained on extensive datasets of annotated operation notes. These datasets may include a wide variety of surgical procedures, with each note containing labeled operation deviations (e.g., with operation labels 124) corresponding to patient-specific or surgeon-specific factors (operation factors 140). The module may process this unstructured data by recognizing patterns, context, and relevant medical terminology, enabling it to accurately categorize the operation deviations 138 identified within the operation notes 112. The NLP model may be trained with dataset comprising annotated operation notes. Each note may be labeled to identify whether operation deviations within the procedure are due to patient-specific or surgeon-specific factors. This dataset may be curated to include a diverse range of cases, ensuring that the model can generalize across different types of surgeries and patient populations. The NLP models may be trained using supervised learning techniques, where the labeled data is used to teach the model to recognize and categorize operation deviations 138 based on the patterns observed in the training data. During the training phase, the model's parameters may be iteratively adjusted to minimize the error in categorization, with the goal of improving the model's accuracy and reliability in identifying the correct categorization of deviations. The NLP models may be further configured to evaluate whether the operation deviations 138 have significant implications for patient care and outcomes (relevance datum 156). The NLP models may be also trained with training data that contains operation notes or operation deviations correlated to relevance data.

With continued reference to FIG. 1, in some embodiments, language training data 136 may include exemplary operation deviations correlated to operation factors 140. LLM 128 may be trained with the language training data 136. In some embodiments, processor 104 may determine whether the identified operation factors 140 or operation deviations 138 are clinically relevant (relevance datum 156). In a non-limiting example, processor 104 may determine relevance datum 156 of operation factors 140 or operation deviations 138. In some embodiments, processor 104 may identify operation factor 140 of operation note 112 using a factor classifier 148. Factor classifier 148 may be consistent with any classifier (e.g., training data classifier) discussed in this disclosure. Factor classifier 148 may be trained on factor training data 152, wherein the factor training data 152 may include exemplary operation notes correlated to exemplary operation factors. In some embodiments, operation note 112, operator or subject may be classified to an operation factor 140 and processor 104 may identify operation deviation 138 of operation note 112 based on the operation factor 140 using LLM 128 or any machine-learning module as described in detail with respect to FIG. 3 and the resulting output may be used to update language training data 136. In some embodiments, generating training data and training machine-learning models may be simultaneous.

With continued reference to FIG. 1, memory 108 contains instructions configuring processor 104 to determine a relevance datum 156 of at least an operation deviation 138. For the purposes of this disclosure, a "relevance datum" is a data element that reflects a clinical relevance of an operation deviation. For the purposes of this disclosure, "clinical relevance" refers to the significance or importance of a particular medical finding, treatment, or intervention in the context of patient care on whether the outcome or result of a study or treatment is meaningful enough to influence clinical practice. Clinical relevance is concerned with the practical implications of a treatment-whether it provides benefits that are significant enough to change how patients are managed. For example, a new drug may show statistically significant improvement in lowering blood pressure compared to an existing treatment. However, if the actual difference in blood pressure reduction is minimal and does not translate into a noticeable reduction in the risk of heart attack or stroke, then operation deviation 138 may be considered not clinically relevant. As a non-limiting example, relevance datum 156 may include Boolean value; for instance, if operation deviation 138 is clinically relevant, then relevance datum 156 may be 'yes.'

With continued reference to FIG. 1, memory 108 contains instructions configuring processor 104 to determine an effectiveness datum 160 of at least an operation deviation 138. For the purposes of this disclosure, an "effectiveness datum" is a data element that reflects the success or impact of an operation deviation. Effectiveness datum 160 may indicate whether statistically significant differences exist or not when operation deviation 138 is applied. Effectiveness datum 160 may also indicate the extent to which operation deviation 138 achieves. As a non-limiting example, effectiveness datum 160 may include Boolean value; for instance, if operation deviation 138 is clinically effective, then effectiveness datum 160 may be 'yes.' As another non-limiting example, effectiveness datum 160 may include a quantitative characteristic, such as a numerical value within a set range. In some embodiments, effectiveness datum 160 may include low to high scoring. As a non-limiting example, effectiveness datum 160 may be 'low' when there is minimum and/or no clinical effect of operation deviation 138 and effectiveness datum 160 may be 'high' when there is a lot of clinical effect of operation deviation 138.

With continued reference to FIG. 1, determining effectiveness datum 160 includes identifying outcome data 164 within a plurality of operation notes 112 associated with at least a matching operation label 124 using language processing module 130 and determining the effectiveness datum 160 as a function of the outcome data 164. For the purposes of this disclosure, "outcome data" is information related to the results or consequences of a surgical procedure as indicated in an operation note. As a non-limiting example, outcome data 164 May include the duration of hospital stay, which can indicate the recovery speed and the efficiency of the procedure, recovery time, error rate (complication rate), overall success rate, mortality rates, which reflect the safety and success of the surgery; and overall survival rates, which provide a longer-term perspective on the effectiveness of the procedure in extending the patient's life. The examples of outcome data 164 are indicative but not exhaustive. For the purposes of this disclosure, "recovery time" refers to the period it takes for a patient to return to a normal level of health, function, or activity following a medical procedure or surgery. It can encompass the duration from the completion of the procedure until the patient has healed sufficiently to resume their usual daily activities without significant limitations or complications. For the purposes of this disclosure, "error rate" refers the frequency at which complications occur during or after a medical procedure or treatment. As a non-limiting example, outcome data 164 may include progression-free survival rates for assessing how well the surgery has controlled the disease, the incidence of postoperative complications, such as infections or bleeding, the rate of reoperation, which can suggest the necessity of further surgical intervention, and the quality of life post-surgery, which evaluates the patient's well-being and functional status after recovery.

With continued reference to FIG. 1, in some embodiments, processor 104 may identify outcome data 164 as a function of operation labels 124. As a non-limiting example, processor 104 may determine an outcome label, complication label and/or postoperative condition label of operation label 124 as outcome data 164. The examples of the outcome label, complication label and/or postoperative condition label are illustrated in FIG. 8. In a non-limiting example, processor 104 may analyze operation note 112 using language processing module 130 to find keywords that are related to outcome of operation from the operation note 112.

With continued reference to FIG. 1, determining relevance datum 156 may include generating a query 168 as a function of at least an operation deviation 138, receiving a user input 144 associated with the query 168 from a plurality of users and determining the relevance datum 156 as a function of the user input 144. A "query" for the purposes of the disclosure is a string of characters that poses a question. As a non-limiting example, query 168 may be generated to request confirmation or validation from a surgeon or other medical professionals regarding relevance datum 156 of operation deviation 138. For the purposes of this disclosure, a "user input" is data input or command provided by a user to a computer system, software application, or interface. As a non-limiting example, user may input a user input 144 using chatbot, user interface of user device 120, or the like. In some embodiments, user input 144 may include a directive or query expressed in natural language, code, or any other format. In some embodiments, user input 144 may include text, audio, gestures, button clicks, image, video, or the like. For example, and without limitation, query 168 may ask a user if they think operation deviation 138 meets clinical relevance and user may input a user input 144 as 'yes' or 'no.' (relevance datum 156). The user input 144 received from a user may be determined or used as relevance datum 156.

With continued reference to FIG. 1, determining relevance datum 156 and/or effectiveness datum 160 may include retrieving at least a reference operation as a function of operation deviation 138 from operation database 116, analyzing the at least a reference operation and the operation deviation 138 to determine consistency and reliability of the operation deviation 138 across different reference cases and determining the relevance datum 156 and/or effectiveness datum 160 as a function of the analysis. For the purposes of this disclosure, a "reference operation" is a similar past surgery where the same or a comparable operation deviation was applied. The analysis may focus on determining whether the operation deviation 138 consistently produces favorable outcomes (relevance datum 156) or if its effectiveness (effectiveness datum 160) varies across different scenarios. In a non-limiting example, the use of a new laparoscopic technique (operation deviation 138) for gallbladder removal may be analyzed by querying operation database 116 to retrieve past cases (reference operation) where this laparoscopic technique was employed. In some embodiments, reference operations may be selected based on similar patient profiles, surgical conditions, and the use of the same technique (e.g., operation factor 140, operation label 124, and the like). Once the reference operations are identified, they may be analyzed to evaluate whether the laparoscopic technique consistently results in favorable outcomes (relevance datum 156, effectiveness datum 160, and the like), such as shorter recovery times or fewer complications, across different patients and scenarios. This analysis might involve statistical comparisons, pattern identification, and checking for any deviations from expected outcomes. Based on the results of this analysis, relevance datum 156 may be determined, indicating whether the laparoscopic technique reliably produces better outcomes and should be recommended as a standard practice (modified operation data 172), or whether its inconsistent results suggest the need for further evaluation or more limited use.

With continued reference to FIG. 1, in some embodiments, processor 104 may determine relevance datum 156 using a relevance machine-learning model. In some embodiments, processor 104 may be configured to generate relevance training data. In a non-limiting example, relevance training data may include exemplary operation deviations having specific operation labels or operations factors correlated to exemplary relevance data. In some embodiments, relevance training data may be stored in operation database 116. In some embodiments, relevance training data may be received from one or more users, operation database 116, external computing devices, and/or previous iterations of processing. As a non-limiting example, relevance training data may include instructions from a user, who may be an expert user, a past user in embodiments disclosed herein, or the like, which may be stored in memory and/or stored in operation database 116, where the instructions may include labeling of training examples. In some embodiments, relevance training data may be updated iteratively on a feedback loop. As a non-limiting example, processor 104 may update relevance training data iteratively through a feedback loop as a function of operation note 112, operation label 124, operation deviation 138, operation factor 140, output of factor classifier 148, LLM 128, or any machine-learning models described in this disclosure, or the like. In some embodiments, processor 104 may be configured to generate relevance machine-learning model. In a non-limiting example, generating relevance machine-learning model may include training, retraining, or fine-tuning relevance machine-learning model using relevance training data or updated relevance training data. In some embodiments, processor 104 may be configured to determine relevance datum 156 using relevance machine-learning model (i.e. trained or updated relevance machine-learning model).

With continued reference to FIG. 1, in some embodiments, processor 104 may determine effectiveness datum 160 using an effectiveness machine-learning model. In some embodiments, processor 104 may be configured to generate effectiveness training data. In a non-limiting example, effectiveness training data may include exemplary operation deviations having specific operation labels correlated to exemplary effectiveness data. In some embodiments, effectiveness training data may be stored in operation database 116. In some embodiments, effectiveness training data may be received from one or more users, operation database 116, external computing devices, and/or previous iterations of processing. As a non-limiting example, effectiveness training data may include instructions from a user, who may be an expert user, a past user in embodiments disclosed herein, or the like, which may be stored in memory and/or stored in operation database 116, where the instructions may include labeling of training examples. In some embodiments, effectiveness training data may be updated iteratively on a feedback loop. As a non-limiting example, processor 104 may update effectiveness training data iteratively through a feedback loop as a function of operation note 112, operation label 124, operation deviation 138, operation factor 140, output of factor classifier 148, LLM 128, or any machine-learning models described in this disclosure, or the like. In some embodiments, processor 104 may be configured to generate effectiveness machine-learning model. In a non-limiting example, generating effectiveness machine-learning model may include training, retraining, or fine-tuning effectiveness machine-learning model using effectiveness training data or updated effectiveness training data. In some embodiments, processor 104 may be configured to determine effectiveness datum 160 using effectiveness machine-learning model (i.e. trained or updated effectiveness machine-learning model).

With continued reference to FIG. 1, memory 108 contains instructions configuring processor 104 to generate modified operation data 172 as a function of effectiveness datum 160 and relevance datum 156 of at least an operation deviation 138. For the purposes of this disclosure, "modified operation data" is data related to a surgical technique that has been adjusted or altered. As a non-limiting example, modified operation data 172 may include an optimal version of the surgical technique or methods for operation that combines operation deviations 138 with the highest or best effectiveness datum 160 and relevance datum 156. In a non-limiting example, modified operation data 172 may include a method that integrated a minimally invasive approach from one technique that has shown superior recovery times (effectiveness datum 160) with a specific suturing method from another technique that has demonstrated significant improvements in patient outcomes and long-term stability (relevance datum 156). In another non-limiting example, modified operation data 172 may also include adaptations that enhance procedural efficiency, such as reducing the duration of surgery while maintaining or improving the success rates of the operation.

With continued reference to FIG. 1, in some embodiments, generating modified operation data 172 may include ordering at least an operation deviation 138 having at least a matching operation label 124 as a function of effectiveness datum 160 and generating modified operation data 172 as a function of the order. In some embodiments, processor 104 may take different surgical variations (operation deviations 138) that share the same type or category (operation label 124) and may organize them according to their effectiveness (effectiveness datum 160). For example, and without limitation, operation deviations 138 may be ranked based on specific data measuring their success, such as recovery time, complication rates, and long-term outcomes. Once these variations are ordered from most to least effective, a new and optimized surgical technique (modified operation data 172) may be generated, using processor 104, by incorporating the best aspects of the top-ranked variations. For example, and without limitation, in the case of knee replacement surgeries (operation label 124: "Total Knee Arthroplasty"), the operation deviation 138 might be ranked based on outcome data 164 (such as recovery time, complication rates, and joint stability. The new technique may then combine the most effective elements from each top-ranked variation, such as the method from one variation that shortens recovery time, the approach from another that minimizes complications, and the technique from a third that enhances long-term stability. This results in an optimized surgical procedure that maximizes effectiveness across all relevant metrics. In some embodiments, modified operation data 172 may include a combination of multiple operation deviations 138 identified based on effectiveness datum 160. In a non-limiting example, modified operation data 172 may include five operation deviations 138 that were identified as effective or variations that produced significant outcome (outcome data 164).

With continued reference to FIG. 1, in some embodiments, processor 104 may generate modified operation data 172 using LLM 128, operation modifying machine-learning model 176, and the like. In some embodiments, user may manually input modified operation data 172. In some embodiments, processor 104 may retrieve modified operation data 172 from operation database 116. In some embodiments, processor 104 may be configured to generate operation modification training data. In a non-limiting example, operation modification training data may include correlations between exemplary operation deviations and/or exemplary effectiveness data and exemplary modified operation data. In some embodiments, operation modification training data may be stored in operation database 116. In some embodiments, operation modification training data may be received from one or more users, operation database 116, external computing devices, and/or previous iterations of processing. As a non-limiting example, operation modification training data may include instructions from a user, who may be an expert user, a past user in embodiments disclosed herein, or the like, which may be stored in memory and/or stored in operation database 116, where the instructions may include labeling of training examples. In some embodiments, operation modification training data may be updated iteratively on a feedback loop. As a non-limiting example, processor 104 may update operation modification training data iteratively through a feedback loop as a function of operation note 112, operation label 124, operation deviation 138, operation factor 140, output of factor classifier 148, LLM 128, previously used modified operation data 172 or operation deviations 138, or output of any machine-learning models described in this disclosure, or the like. In some embodiments, processor 104 may be configured to generate operation modifying machine-learning model 176. In a non-limiting example, generating operation modifying machine-learning model 176 may include training, retraining, or fine-tuning operation modifying machine-learning model 176 using operation modification training data or updated operation modification training data. In some embodiments, processor 104 may be configured to generate modified operation data 172 using operation modifying machine-learning model 176 (i.e. trained or updated operation modifying machine-learning model 176). In some embodiments, processor 104 may generate modified operation data 172 using LLM 128 as a function of an output of operation modifying machine-learning model 176. As a non-limiting example, processor 104 may input an output of operation modifying machine-learning model 176 into LLM 128 and the LLM 128 may generate textual output (modified operation data 172) that can be transmitted to user interface or user device 120.

With continued reference to FIG. 1, in some embodiments, processor 104 may be configured to generate a user interface displaying modified operation data 172 on a user device 120. In a non-limiting example, processor 104 may generate user interface displaying operation note 112, operation deviation 138, relevance datum 156, effectiveness datum 160, operation label 124, modified operation data 172, and the like. In a non-limiting example, processor 104 may generate a report related to operation deviation 138 and modified operation data 172. These reports may serve multiple purposes, including fulfilling regulatory requirements, supporting clinical decisions, and providing data for research studies. For example and without limitation, processor 104 may generate a report detailing the changes made for modified operation data 172, the rationale behind them, the outcomes observed, and any analysis performed. This report could be used for a regulatory audit to demonstrate that the hospital is following best practices, or it could be submitted as part of a research study evaluating the effectiveness of the new technique.

With continued reference to FIG. 1, for the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 104. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, processor 104 may receive feedback data from a user or user device 120 and update modified operation data 172 as a function of the feedback data. For the purposes of this disclosure, "feedback data" is information collected from users after a modified operation data has been implemented by the users or delivered to the users. Processor 104 may track the outcomes of modified operation data 172, such as patient recovery times, complication rates, and overall success of the procedures. As a non-limiting example, feedback data may include surgeons' observations about the ease or difficulty of performing the technique of operation deviation 138, nurses' comments on patient recovery times after operation deviation 138 is performed, and reports on any unexpected complications that arose after operation deviation 138 is performed. For instance, if surgeons report that the new technique reduces operating time but increases the risk of minor bleeding, processor 104 may update modified operation data 172. As another non-limiting example, feedback data may include postoperative follow-ups where healthcare providers monitor patient recovery, such as data on pain levels, mobility, wound healing, and any adverse effects experienced by the patient. For example, if a hospital or user implements a new pain management protocol (modified operation data 172), feedback data may include that while pain levels are effectively managed, some patients experience drowsiness or nausea, indicating a need for dosage adjustment. Processor 104 may create a continuous feedback loop, where the effectiveness of the modified operation data 172 is assessed, any necessary adjustments or improvements may be identified based on results, and modified operation data 172 may be updated based on the results.

With continued reference to FIG. 1, in some embodiments, processor 104 may manage operation notes 112 and modified operation data 172 to ensure that all data is encrypted and access is restricted to authorized personnel. In some embodiments, processor 104 may ensure that to meet security standards and comply with regulations like Health Insurance Portability and Accountability Act (HIPAA). Additionally, if new regulations are introduced, processor 104 may be updated to remain compliant. In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 2:
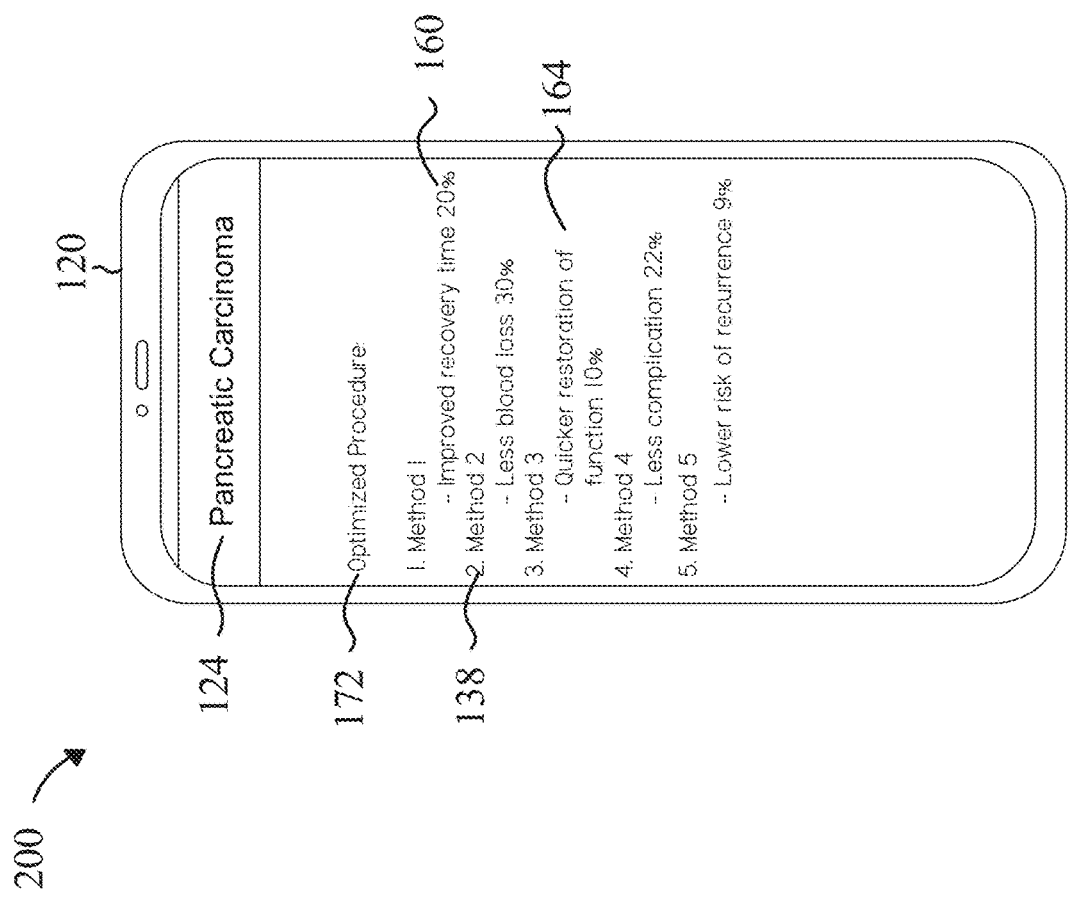
FIG. 2 illustrates an exemplary operator interface displaying modified operation data on a user device.

Referring now to FIG. 2, an exemplary user interface 200 displaying modified operation data 172 on a user device 120 is illustrated. In some embodiments, user interface 200 may display operation label 124, modified operation data 172 generated based on operation label 124 and associated effectiveness datum 160. As a non-limiting example, processor 104 may generate modified operation data 172 related to operation label 124, "Pancreatic Carcinoma," that is labeled for operation notes 112, and effectiveness datum 160 may be generated for each of operation deviations used for modified operation data 172. As shown in FIG. 2, modified operation data 172 may include five variations (operation deviations 136) for a procedure for Pancreatic Carcinoma, following with outcomes (outcome data 164) and their effectiveness (effectiveness datum 160) of each variations. For example, and without limitation, modified operation data 172 may include a first method (operation deviation 136) that has an outcome of 20% improved recovery time and second method that has an outcome of 30% less blood loss.

Figure 3:
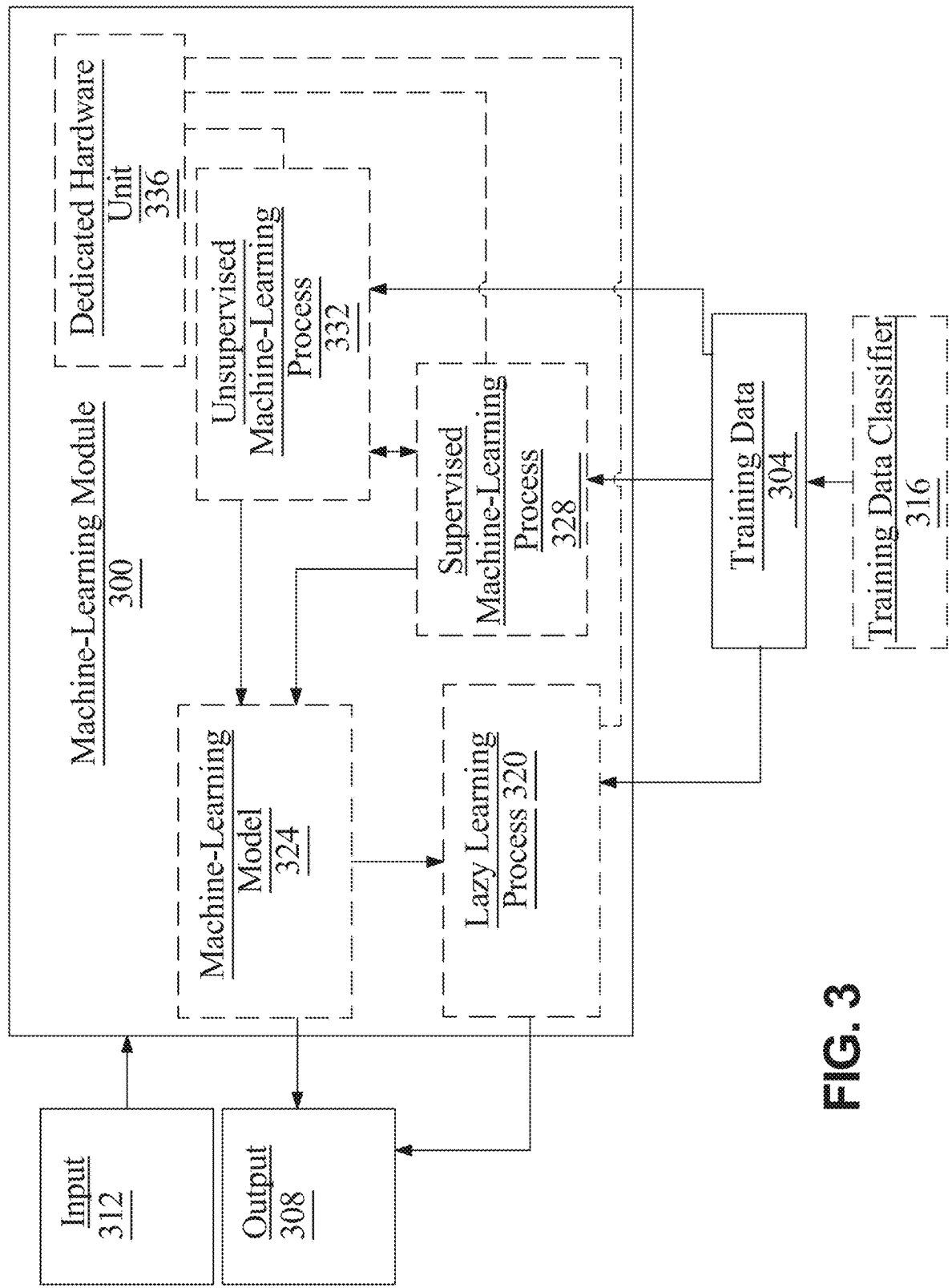
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

With continued reference to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include operation note 112, operation label 124, operation deviation 138, operation factor 140, outcome data 164, relevance datum 156, effectiveness datum 160, and the like. As a non-limiting illustrative example, output data may include operation label 124, operation deviation 138, operation factor 140, outcome data 164, relevance datum 156, effectiveness datum 160, modified operation data 172, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to operation factors 140. For example, and without limitation, training data classifier 316 may classify elements of training data to operation factors 140 related to surgeon-specific factors; the surgeon's experience, place of training, personal preference, exposure to new innovations in techniques, surgical philosophy, judgment in real time during the surgery, surgical team dynamics, time availability, scheduling, and the institutional protocols and resources at the location where the surgeon is practicing. For example, and without limitation, training data classifier 316 may classify elements of training data to operation factors 140 related to patient-specific factors; the unique anatomy of the patient, comorbidities, the location and extent of the tumor, the patient's age, and overall health.

With continued reference to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

With continued reference to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

With continued reference to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

With continued reference to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include operation note 112, operation label 124, operation deviation 138, operation factor 140, outcome data 164, relevance datum 156, effectiveness datum 160, and the like as described above as inputs, operation label 124, operation deviation 138, operation factor 140, outcome data 164, relevance datum 156, effectiveness datum 160, modified operation data 172, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

With continued reference to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
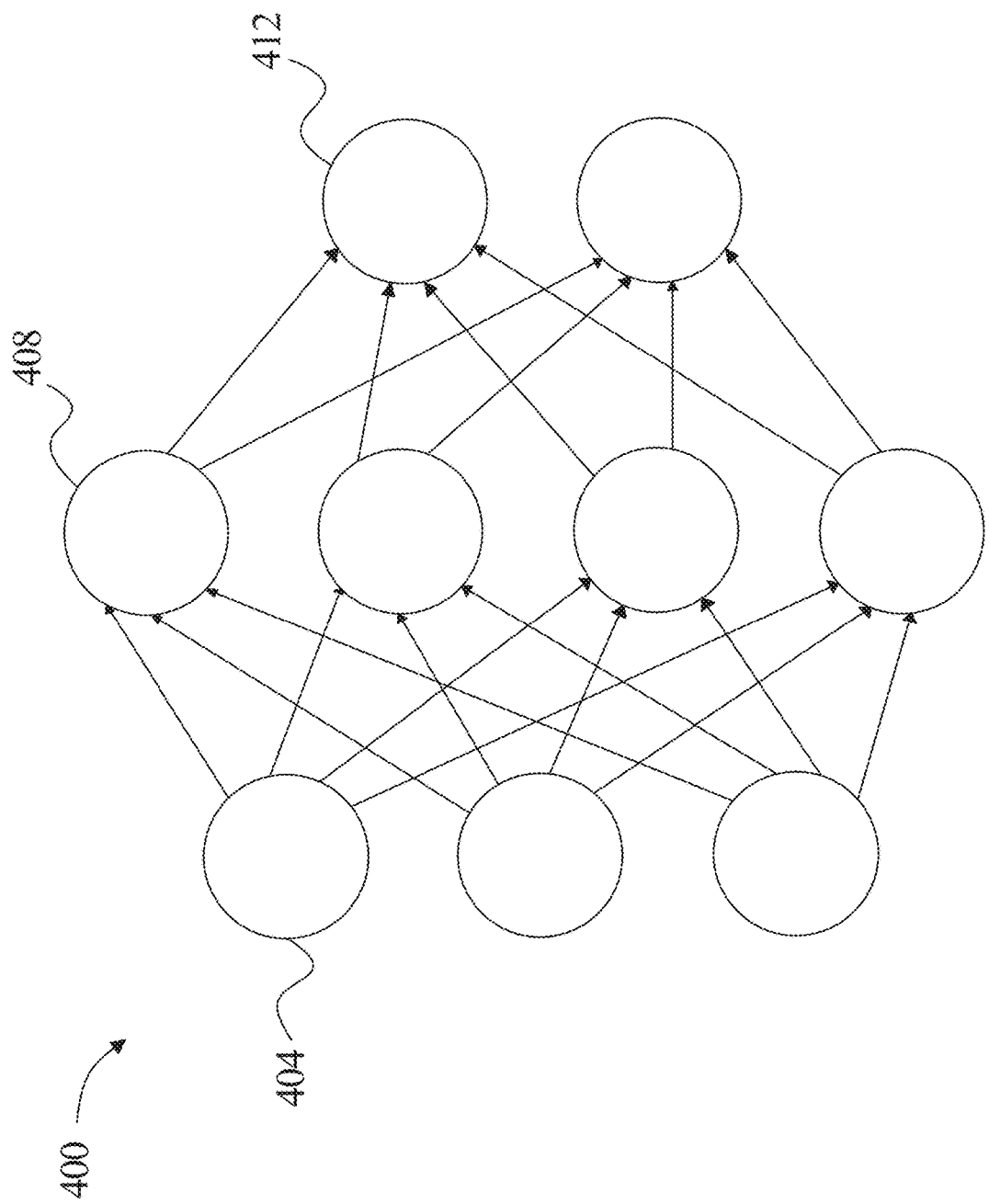
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
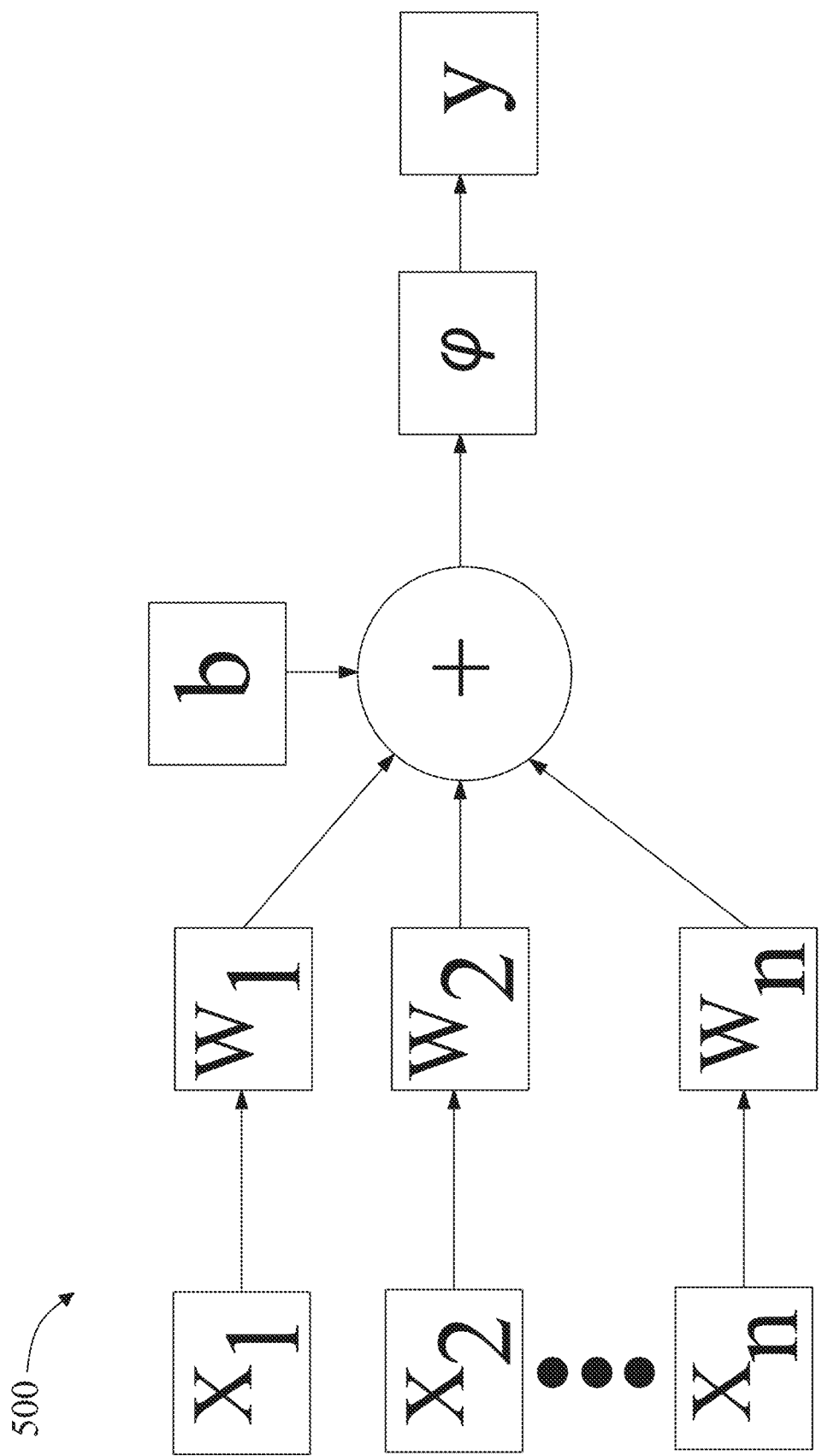
FIG. 5 illustrates a block diagram of an exemplary node in a neural network.

Referring now to FIG. 5, an exemplary embodiment of a node 500 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=(x)$, a rectified linear unit function such as $f(x)=\max(0,x)$, a "leaky" and/or "parametric" rectified linear unit function such as $f(x)=\max(ax,x)$ for some a, an exponential linear units function such as $f(x)=\{x$ for $x \geq 0 \alpha(e^x-1)$ for $x<0$ for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $f(x)=\lambda\{\alpha(e^x-1)$ for $x<0$ x for $x \geq 0$. Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
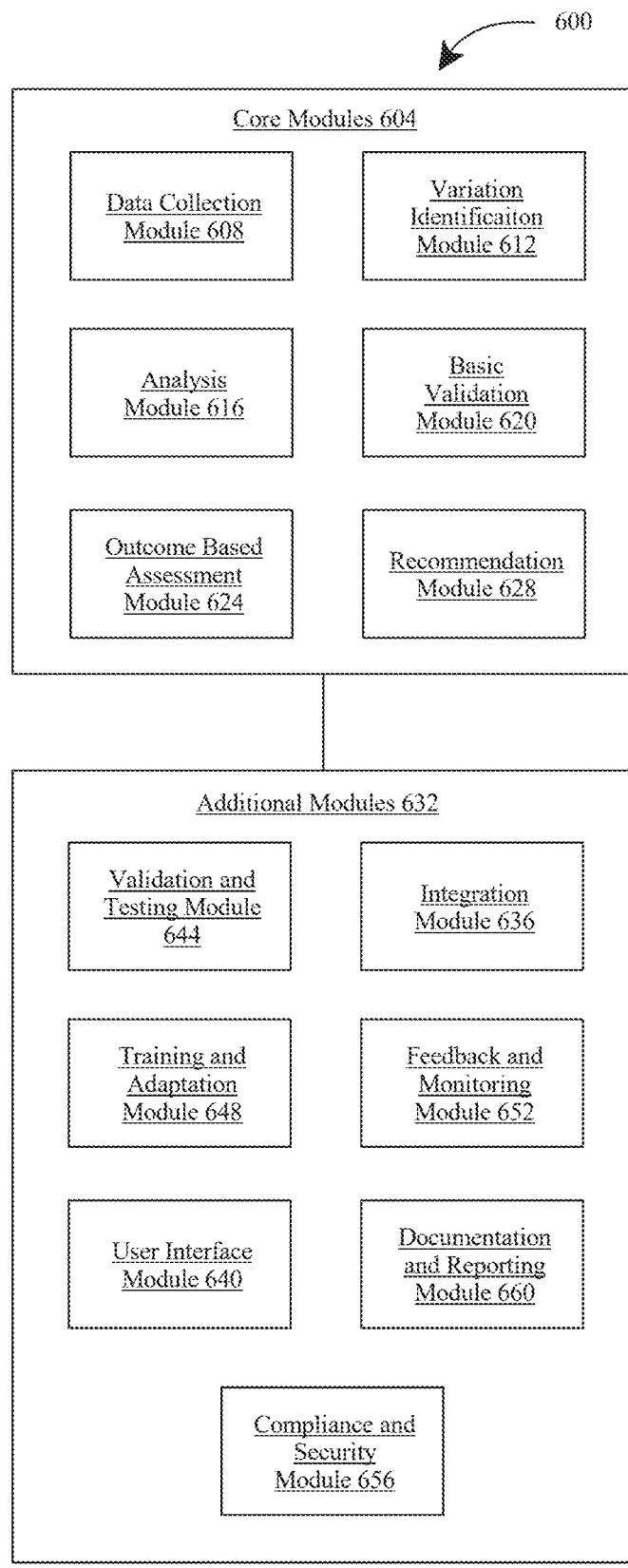
FIG. 6 illustrates an exemplary system for optimizing an operation using a deviation.

Referring now to FIG. 6, a block diagram of an exemplary system 600 for optimizing surgical procedures is illustrated. In some embodiments, system 600 may include core modules 604. For the purposes of this disclosure, a "core module" is a central or foundational component of a system 600 that performs the essential functions critical to the system's 600 overall operation. In some embodiments, core modules 604 may include a data collection module 608 configured to aggregate multiple surgical procedure notes (e.g., operation notes 112) for a particular surgical operation performed by different healthcare professionals (e.g., operators). In some embodiments, the data collection module 608 may further include means for receiving and storing data related to multiple surgical procedure notes for a particular surgical operation from various sources and means for standardizing the received data to ensure consistency in analysis.

With continued reference to FIG. 6, in some embodiments, core modules 604 may include a variation identification module 612 configured to identify subtle variations (operation deviations 138) in the techniques of the aggregated surgical procedures. In some embodiments, the variation identification module 612 may further include means for detecting and documenting subtle differences in techniques between different healthcare professionals' approaches to the same surgical procedure by means of large language models (LLMs), natural language processing (NLP), and other custom-based business tools.

With continued reference to FIG. 6, in some embodiments, core modules 604 may include an analysis module 616 configured to assess the aggregated surgical procedures and identify variations. In some embodiments, the analysis module 616 may further include means for implementing LLMs to interpret, categorize and analyze the documented variations, means for implementing NLP to interpret, categorize and analyze the documented variations and means for implementing native business-based rules to interpret, categorize and analyze the documented variations.

With continued reference to FIG. 6, in some embodiments, core modules 604 may include a basic validation module 620 configured to test if the identified variation by analysis module meets clinical relevance (e.g., relevance datum 156). In some embodiments, the basic validation of the identified variation may further include means for querying LLMs to quantify the importance of the identified variation, means for querying (e.g., query 168) healthcare professionals specialized in the domain of interest to gather expert feedback (e.g., user input 144) and validate the clinical relevance and applicability of the identified variation, means for conducting a preliminary statistical analysis of similar cases to determine the consistency and reliability of the identified variation across different scenarios, and means for engaging a panel of experts for peer review to provide a consensus on the identified variation's potential value and validity.

With continued reference to FIG. 6, in some embodiments, core modules 604 may include an outcome-based assessment module 624 configured to evaluate the surgical variations identified by the variation module 612 and analysis module 616 based on their outcomes (e.g., outcome data 164) and effectiveness (e.g., effectiveness datum 160). In some embodiments, the outcome-based assessment module 624 may further include means for evaluating the outcomes of variations identified by the variation and analysis modules within each surgical procedure based on predefined metrics such as patient recovery time, complication rates, and overall success rates.

With continued reference to FIG. 6, in some embodiments, core modules 604 may include a recommendation module 628 configured to identify and recommend the optimal modified version of the surgical technique (e.g., modified operation data 172) by incorporating the best aspects of the different approaches. In some embodiments, the recommendation module 628 may further include means for generating a ranked list of surgical technique variations within a particular surgical procedure based on their predicted effectiveness and outcomes as identified by the outcomes module.

With continued reference to FIG. 6, in addition to core modules 604, the following additional modules 632 may work in close tandem with the core modules 604 to refine their functionality and ensure comprehensive performance. Integration module 636 may seamlessly integrate the software with existing Electronic Health Records (EHR) systems and other surgical planning tools, ensuring smooth data flow and compatibility. User interface module 640 presents the recommended variations along with supporting data in a clear and intuitive interface, making it easier for surgeons to understand and apply the recommendations. Validation and testing module 644 may then validate and test the claims made by the core modules, ensuring accuracy and reliability. Following this, training and adaptation module 648 may integrate real-time data with the existing workflow, allowing the software to adapt and improve over time. Feedback and monitoring module 652 may gather feedback from users, tracking outcomes and collecting input from healthcare workers after recommendations are implemented, thereby establishing a continuous feedback loop. Compliance and security module 656 may ensure that the software meets all regulatory requirements while maintaining robust data security and patient privacy. Lastly, documentation and reporting module 660 may assist in generating comprehensive reports for the identified variations and their analysis, providing essential documentation for regulatory, clinical, and research purposes.

Referring now to FIG. 7A, an exemplary operation note 700*a* with operation labels 124 is illustrated. The operation note 700*a* and operation labels 124 illustrated in FIG. 7A are indicative but not exhaustive. Operation note 700*a* may be consistent with operation note 112. Operation note 700*a* may represent specific types of medical conditions that is subject to get procedures or surgeries such as "Laparoscopic Cholecystectomy" as illustrated in FIG. 7A. Operation note 700*a* may include a patient label 704 that descriptively categorize patient information such as "Name: John Doe, Age: 58, Gender: Male, Medical Record Number: 123456789" as shown in FIG. 7A. Operation note 700*a* may include a preoperative condition label 708 that descriptively categorize preoperative diagnosis such as "Cholelithiasis (Gallstones)" as shown in FIG. 7A. Operation note 700*a* may include an operator label 712 that descriptively categorize operators such as "Surgeon: Dr. Jane Smith," "Assistants: Dr. Michael Lee, Nurse Sarah Thompson" and "Anesthesia: General anesthesia administered by Dr. Emily Brown" as shown in FIG. 7A. Operation note 700*a* may include a procedure label 716 that descriptively categorize details of operation procedure such as "Intraoperative Findings: The gallbladder was found to be inflamed but not perforated. Multiple stones were present, with no evidence of bile duct obstruction," "Specimens Removed: Gallbladder with multiple stones, sent for pathological examination." and "The patient was placed in the supine position, and general anesthesia was induced. A Veress needle was used to establish pneumoperitoneum. Four trocars were placed under direct visualization. The gallbladder was identified and carefully dissected from the liver bed using electrocautery. The cystic duct and artery were clipped and divided. The gallbladder was removed through the umbilical port in an EndoCatch bag. Hemostasis was ensured, and the abdominal cavity was irrigated with saline. The pneumoperitoneum was released, and the trocars were removed. The incisions were closed with absorbable sutures and covered with sterile dressings." as shown in FIG. 7A. Operation note 700*a* may include an estimated blood loss label 720 that descriptively categorize estimated blood loss such as "Less than 50 mL" as shown in FIG. 7A. Operation note 700*a* may include a complication label 724 that descriptively categorize complications or errors such as "Complications: None" as shown in FIG. 7A. Operation note 700*a* may include a postoperative condition label 728 that descriptively categorize postoperative conditions such as "Postoperative Condition: The patient was extubated and transferred to the recovery room in stable condition. Vital signs were stable, with no immediate postoperative complications." as shown in FIG. 7A. Operation note 700*a* may include a plan label 732 that descriptively categorize plans after operations such as "Plan: The patient will be monitored in the recovery room for 1-2 hours before being transferred to the surgical ward. Postoperative pain will be managed with IV analgesics. The patient is expected to begin oral intake as tolerated later in the day and may be discharged home the following day if recovery proceeds without complications." as shown in FIG. 7A. Operation note 700*a* may include an outcome label 736 that descriptively categorize outcomes of operation such as "Outcome: The patient stayed in the recovery room for 3 hours and sent to the surgical ward. The patient was discharged after 5 days in the bed. The patient was fully recovered." as shown in FIG. 7A. Operation note 700*a* may include a tool label 740 that descriptively categorize tools used for operation such as "Tools used in procedure: Tool X, Tool Y, Tool Z" as shown in FIG. 7A.

Referring now to FIG. 7B, an exemplary operation note 700*b* is shown. In some embodiments, apparatus 100 may be configured to assign operation labels 124 from unstructured text, such as unstructured operation nodes. For example, exemplary operation note 700*b* may have large portion of unstructured text. Apparatus 100 may assign operation labels 124 to the unstructured text, such as a tool label 740, outcome label 736, complication label 724, and the like. In some embodiments, apparatus 100 may assign a variation label 744 to elements of operation note 700*b* that differ from other procedures. In some embodiments, apparatus 100 may assign a tissue handling label 748 to elements of text indicating how a doctor handled tissue during the procedure. For example, apparatus 100 may assign a tissue handling label to one or more textual tokens relevant to the removal of tissue from a patient. In some embodiments, apparatus 100 may assign an approach label 752 to elements of text (or textual tokens) indicating a doctors approach to the procedure. The assignment of operation labels 124 may be further disclosure with reference to FIGS. 1-6.

Referring now to FIG. 8, a flow diagram of an exemplary method 800 for optimizing an operation using a deviation is disclosed. Method 800 contains a step 805 of receiving, using at least a processor, a plurality of operation notes associated with a plurality of operators and a plurality of operations. This may be implemented as reference to FIGS. 1-7B.

With continued reference to FIG. 8, method 800 contains a step 810 of labeling, using at least a processor, a plurality of operation notes to at least an operation label using a label classifier. This may be implemented as reference to FIGS. 1-7B.

With continued reference to FIG. 8, method 800 contains a step 815 of identifying, using at least a processor, at least an operation deviation, using a language processing module, in a portion of a plurality of operation notes having the at least a matching operation label as a function of at least an operation factor. In some embodiments, identifying the at least an operation deviation may include generating language training data, wherein the language training data may include exemplary operation notes correlated to operation deviations, training a large language model using the language training data; and identifying the at least an operation deviation using the trained large language model. In some embodiments, identifying the at least an operation deviation may include updating the language training data as a function of an output of a factor classifier by merging the output into the exemplary operation notes of the language training data. In some embodiments, method 800 may further include determining, using the at least a processor, the at least an operation factor using the language processing module. The method of claim 11, wherein identifying the at least an operation deviation may include generating factor training data, wherein the factor training data may include exemplary operation notes correlated to exemplary operation factors, training a factor classifier using the factor training data; and determining the at least an operation factor for the plurality of operation notes using the trained factor classifier. In some embodiments, the operation deviation may include an instrument handling deviation. In some embodiments, the operation deviation may include a sequence deviation. These may be implemented as reference to FIGS. 1-7B.

With continued reference to FIG. 8, method 800 contains a step 820 of determining, using at least a processor, a relevance datum of at least an operation deviation. In some embodiments, determining the relevance datum may include generating a query as a function of the at least an operation deviation, receiving an operator input associated with the query from the plurality of operators; and determining the relevance datum as a function of the operator input. These may be implemented as reference to FIGS. 1-7B.

With continued reference to FIG. 8, method 800 contains a step 825 of determining, using at least a processor, an effectiveness datum of at least an operation deviation, wherein determining the effectiveness datum may include identifying outcome data within the plurality of operation notes associated with the at least a matching operation label using the language processing module and determining the effectiveness datum as a function of the outcome data. In some embodiments, the outcome data may include recovery time one or more of recovery time, complication rate, mortality rate or success rate. These may be implemented as reference to FIGS. 1-7B.

With continued reference to FIG. 8, method 800 contains a step 830 of generating, using at least a processor, modified operation data as a function of an effectiveness datum and a relevance datum of at least an operation deviation. In some embodiments, generating the modified operation data may include generating operation modification training data, wherein operation modification training data may include exemplary operation deviations and exemplary effectiveness data correlated to exemplary modified operation data, training an operation modifying machine-learning model using the operation modification training data and generating the modified operation data using the trained operation modifying machine-learning model. These may be implemented as reference to FIGS. 1-7B.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
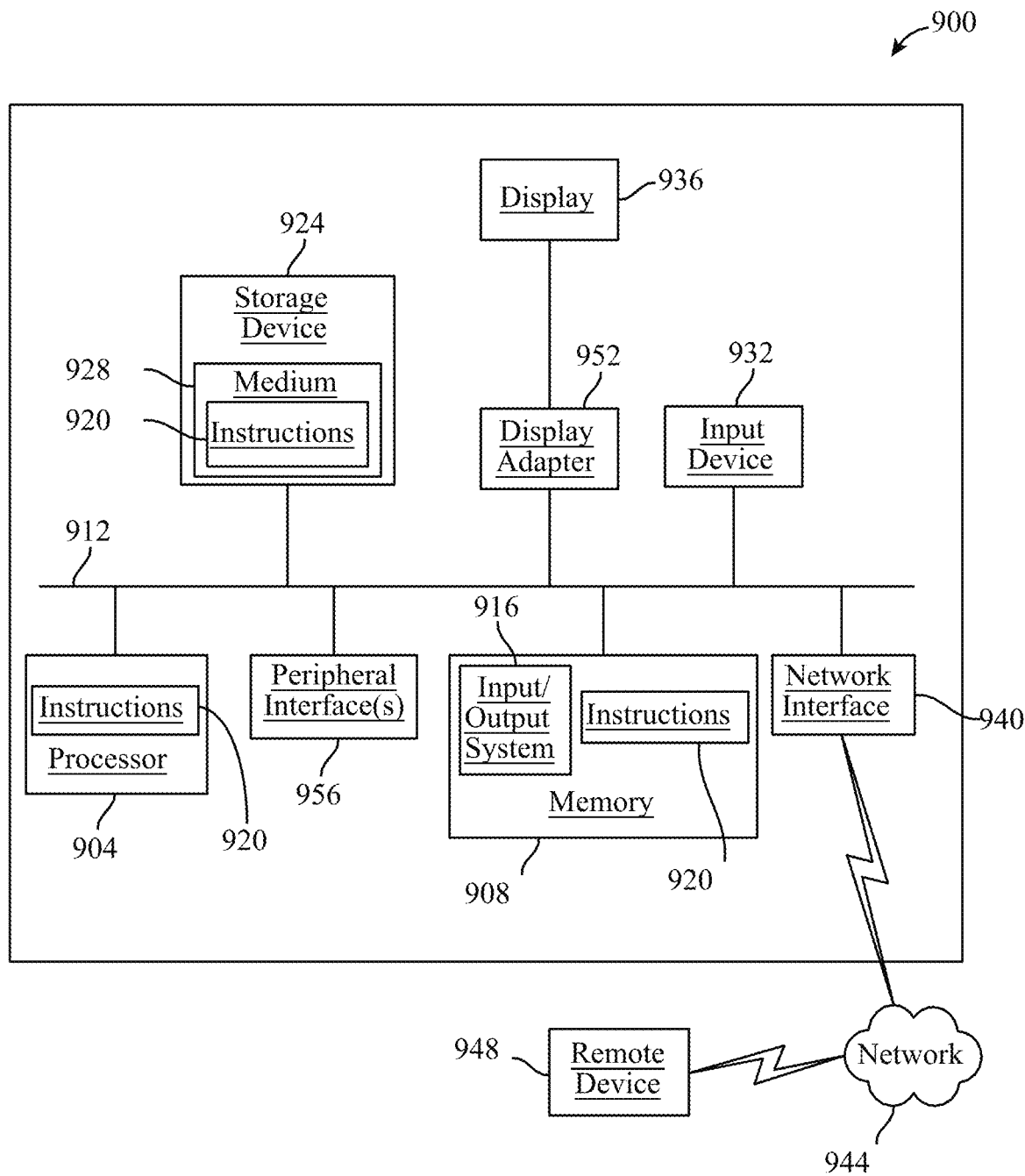
FIG. 9 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912. Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for optimizing an operation using a deviation, the apparatus comprising:
   at least a processor; and
   a memory communicatively connected to the at least a processor, wherein the memory contains instructions configuring the at least a processor to:
      receive a plurality of operation notes associated with a plurality of operators and a plurality of operations;
      label the plurality of operation notes to at least an operation label using a label classifier;
      identify at least an operation deviation, using a language processing module, in a portion of the plurality of operation notes having the at least a matching operation label as a function of at least an operation factor;
      determine a relevance datum of the at least an operation deviation, wherein the relevance datum comprises a data element reflecting a clinical relevance of the operation deviation;
      determine an effectiveness datum of the at least an operation deviation, wherein the effectiveness datum comprises a data element reflecting success or impact of the operation deviation, wherein determining the effectiveness datum comprises:
         identifying outcome data within the plurality of operation notes associated with the at least a matching operation label using the language processing module, wherein the outcome data comprises results of a surgical procedure, wherein the surgical procedure is comprised of the operation deviations as indicated in the operation notes; and
         determining the effectiveness datum as a function of the outcome data;
      generate, using an operation modifying machine-learning model, modified operation data as a function of the effectiveness datum and the relevance datum of the at least an operation deviation, wherein generating modified operation data comprises generating an optimized surgical technique, wherein generating the optimized surgical technique comprises combining more than one operation deviation as a function of the outcome data; and
      generate, using the at least a processor, a report of the modified operation data.

2. The apparatus of claim 1, wherein identifying the at least an operation deviation comprises:
   generating language training data, wherein the language training data comprises exemplary operation notes correlated to operation deviations;
   training a large language model using the language training data; and
   identifying the at least an operation deviation using the trained large language model.

3. The apparatus of claim 2, wherein identifying the at least an operation deviation comprises updating the language training data as a function of an output of a factor classifier by merging the output into the exemplary operation notes of the language training data.

4. The apparatus of claim 1, wherein the memory contains instructions configuring the at least a processor to determine the at least an operation factor using the language processing module.

5. The apparatus of claim 1, wherein identifying the at least an operation deviation comprises:
   generating factor training data, wherein the factor training data comprises exemplary operation notes correlated to exemplary operation factors;
   training a factor classifier using the factor training data; and
   determine the at least an operation factor for the plurality of operation notes using the trained factor classifier.

6. The apparatus of claim 1, wherein determining the relevance datum comprises:
   generating a query as a function of the at least an operation deviation;
   receiving an operator input associated with the query from the plurality of operators; and
   determining the relevance datum as a function of the operator input.

7. The apparatus of claim 1, wherein the operation deviation comprises an instrument handling deviation.

8. The apparatus of claim 1, wherein the operation deviation comprises a sequence deviation.

9. The apparatus of claim 1, wherein the outcome data comprises one or more of recovery time, complication rate, mortality rate and success rate.

10. The apparatus of claim 1, wherein generating the modified operation data comprises:
    generating operation modification training data, wherein operation modification training data comprises exemplary operation deviations and exemplary effectiveness data correlated to exemplary modified operation data;
    training an operation modifying machine-learning model using the operation modification training data; and
    generating the modified operation data using the trained operation modifying machine-learning model.

11. A method for optimizing an operation using a deviation, the method comprising:
    receiving, using at least a processor, a plurality of operation notes associated with a plurality of operators and a plurality of operations;
    labeling, using the at least a processor, the plurality of operation notes to at least an operation label using a label classifier;
    identifying, using the at least a processor, at least an operation deviation, using a language processing module, in a portion of the plurality of operation notes having the at least a matching operation label as a function of at least an operation factor;
    determining, using the at least a processor, a relevance datum of the at least an operation deviation, wherein the relevance datum comprises a data element reflecting a clinical relevance of the operation deviation;
    determining, using the at least a processor, an effectiveness datum of the at least an operation deviation, wherein the effectiveness datum comprises a data element reflecting success or impact of the operation deviation, wherein determining the effectiveness datum comprises:
        identifying outcome data within the plurality of operation notes associated with the at least a matching operation label using the language processing module, wherein the outcome data comprises results of a surgical procedure, wherein the surgical procedure is comprised of the operation deviations as indicated in the operation notes; and determining the effectiveness datum as a function of the outcome data;

generating, using an operation modifying machine-learning model, modified operation data as a function of the effectiveness datum and the relevance datum of the at least an operation deviation, wherein generating modified operation data comprises generating an optimized surgical technique, wherein generating the optimized surgical technique comprises combining more than one operation deviation as a function of the outcome data; and generating, using the at least a processor, a report of the modified operation data.

12. The method of claim 11, wherein identifying the at least an operation deviation comprises:

generating language training data, wherein the language training data comprises exemplary operation notes correlated to operation deviations;

training a large language model using the language training data; and identifying the at least an operation deviation using the trained large language model.

13. The method of claim 12, wherein identifying the at least an operation deviation comprises updating the language training data as a function of an output of a factor classifier by merging the output into the exemplary operation notes of the language training data.

14. The method of claim 11, further comprising:

determining, using the at least a processor, the at least an operation factor using the language processing module.

15. The method of claim 11, wherein identifying the at least an operation deviation comprises:

generating factor training data, wherein the factor training data comprises exemplary operation notes correlated to exemplary operation factors;

training a factor classifier using the factor training data; and determining the at least an operation factor for the plurality of operation notes using the trained factor classifier.

16. The method of claim 11, wherein determining the relevance datum comprises:

generating a query as a function of the at least an operation deviation;

receiving an operator input associated with the query from the plurality of operators; and determining the relevance datum as a function of the operator input.

17. The method of claim 11, wherein the operation deviation comprises an instrument handling deviation.

18. The method of claim 11, wherein the operation deviation comprises a sequence deviation.

19. The method of claim 11, wherein the outcome data comprises one or more of recovery time, complication rate, mortality rate and success rate.

20. The method of claim 11, wherein generating the modified operation data comprises:

generating operation modification training data, wherein operation modification training data comprises exemplary operation deviations and exemplary effectiveness data correlated to exemplary modified operation data;

training an operation modifying machine-learning model using the operation modification training data; and generating the modified operation data using the trained operation modifying machine-learning model.

* * * * *